April 19, 1960
P. J. GEERLINGS
2,933,064
LIVESTOCK FEEDER AND WATERER
Filed June 8, 1959
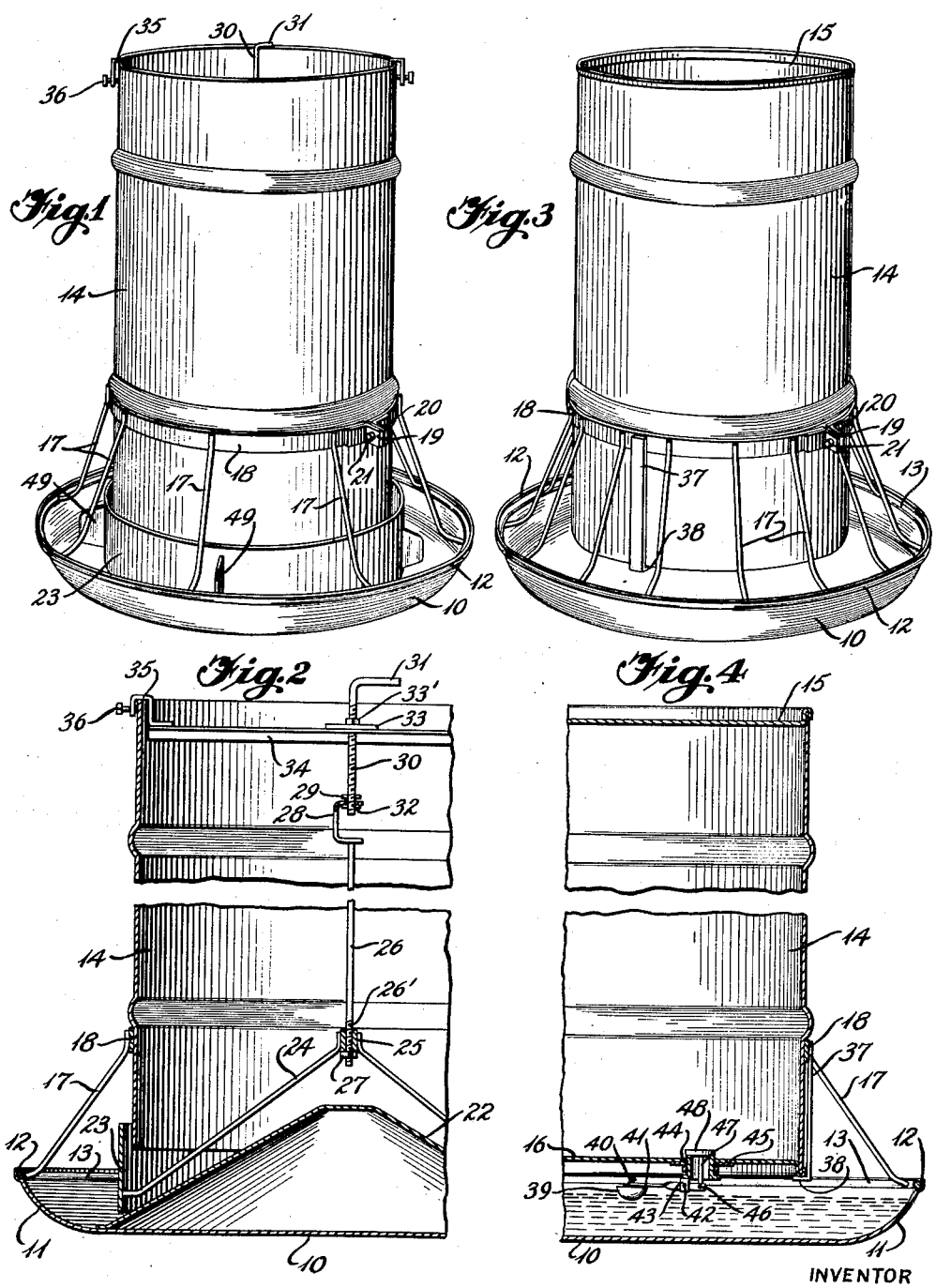
INVENTOR
P. J. GEERLINGS
BY
ATTORNEY

2,933,064
LIVESTOCK FEEDER AND WATERER

Petrus J. Geerlings, Waterloo, Iowa

Application June 8, 1959, Serial No. 818,618

4 Claims. (Cl. 119—53)

This invention relates to the feeding and watering of livestock including hogs and other animals on a farm and elsewhere and to the equipment employed and by which feed and water is made available without the necessity of the constant presence of an attendant.

Feeders and waterers heretofore employed have been expensive and utilized a greater number of parts and amount of material and consequently have not always been readily available, but have been difficult to obtain and did not utilize readily available material and particularly a conventional drum for both a feeder and a water container.

It is an object of the invention to overcome the difficulties enumerated and to provide a relatively simple, inexpensive structure which can be combined with a conventional drum or barrel to provide a feeder and a waterer with such device easily manufactured at small cost.

Other objects and advantages of the invention will be apparent from the following description taken in conjunction with the accompanying drawing, wherein:

Fig. 1 is a perspective of a livestock feeder in accordance with the present invention;

Fig. 2, a fragmentary enlarged section of the feeder of Fig. 1;

Fig. 3, a perspective of a stock waterer in accordance with the present invention; and Fig. 4, a fragmentary enlarged section of the waterer of Fig. 3.

Briefly stated, the invention comprises a trough adapted to support an annular ring having a plurality of radial upwardly inclined supports mounting a clamping ring in which a conventional drum or barrel can be secured and such drum may be used either as a feeder or as a waterer. Valve means are provided for controlling the discharge from the drum as the supply is depleted with such valve means in the feeder having a central adjustable depending support suspended from a bar across the top of the drum or barrel and being actuated by the feeding animals and the valve means in the waterer maintaining a constant water level in accordance with the operation of a float.

With continued reference to the drawing, the combination feeder or waterer of the present invention comprises a circular base or trough-forming vessel or pan 10 having an upwardly turned marginal portion 11 with an annular groove or recess 12 in which a reinforcing ring 13 is removably disposed, being held by friction within such annular groove. The lower end of a container such as a conventional drum or barrel 14 is adapted to be disposed within the trough and the ends 15 and 16 of the container are removed when the device is used as a feeder.

In order to maintain the drum or barrel 14 in proper relation to the trough 10, a series of radial, upwardly inclined supports or braces 17 are provided in spaced relation around the ring 13 with the upper ends of such supports or braces attached to a clamping ring 18. The ends of the ring 18 are turned outwardly to form substantially parallel flanges 19 and 20 which may be connected by a bolt and nut 21. In this clamping ring a conventional drum or barrel can be clamped and supported with the lower end of the drum or barrel slightly spaced from the bottom of the trough or pan 10 to provide a simple trough and container.

The drum or barrel may be provided with simple means for effecting and controlling the discharge from the drum or barrel. In the feeder such means may include an inverted conical distributor 22 mounted centrally of the pan or trough 10 and preferably, although not necessarily, fixed to the pan by welding or in other desired manner. A valve or barrier ring 23 is provided having a series of centrally converging supports 24 attached to lower inner surface of such ring and with the opposite ends of the supports being connected to an internally threaded coupling 25. A support rod 26 having a threaded portion 26' on the lower end thereof is adapted to adjustably engage the coupling 25. Lock nut 27 is provided to maintain the ring 23 and support rod 26 in intimate engagement. The opposite end of the rod 26 is attached to the lower leg of a substantially C-shaped yoke 28, the upper leg of which is provided with an opening 29 through which a screw 30 with an angular crank-forming end 31 is adapted to pass and be freely rotatable therein. The screw 30 is connected to the yoke 28 by pins 32 attached to such screw on each side of the upper leg of the yoke to limit the up and down movement of the yoke and the ring 23. The screw 30 is supported by a reinforcing plate 33 and lock nut 33' on a bar 34 having a hanger 35 and a clamping screw 36 at each end thereof. The hangers are adapted to fit over the upper edges of the drum 14 and be clamped thereto by the screws 36.

With the waterer the structure is the same, except that there need be no distributor, the valve means is somewhat different and due to the weight of the water additional means is provided in the form of supplementary brackets or supports 37 having their upper ends welded or otherwise secured to the clamping ring 18 and with inwardly extending right angular lower extremities 38 on which the drum or barrel is adapted to rest.

When the drum or barrel is used for containing water, a float 39 is provided which is loosely connected by a bolt 40 to a lever arm 41 fulcrumed on a pin 42 and extending through spaced lugs 43 carried on a screw plug 44 adapted to replace the plug (not shown) which threads into a sleeve 45 on the end 16 through which the filling and emptying of the drum usually is accomplished. The end of the arm 41 is connected by a pin 46 with a valve stem 47 which engages a valve 48 which seats against the end of the screw plug 44 through which plug water from the drum can pass when the valve is unseated.

In the operation of the device when used as a feeder, a conventional drum or barrel with both ends removed is rigidly clamped by the ring 18 and a valve or barrier is movably suspended from the top of drum. The valve is raised and lowered by a crank to regulate the amount of feed in the trough. When an animal such as a hog eats from the trough, his snout or nose will strike and move the valve to agitate the feed or contents of the container and cause the same to be discharged into the trough. If desired, radial fins 49 may be attached to the periphery of the valve to move the valve in a horizontal plane to aid in discharging the feed.

When the device is used as a waterer, the ends of the drum or barrel remain on the same and a float valve replaces the conventional bung so that when the drum is rigidly clamped by the ring 18, the valve will maintain a substantially constant water level in the trough.

It will be apparent that a simple device is provided which can be used with a conventional drum or barrel found around the farm, and by the use of the proper valve mechanism the device can be used for feed or water, and in either case can be readily assembled, taken apart for cleaning and reassembled.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. A feeder comprising a base having its margin upturned to provide a trough for the dispensing of feed, said trough having an annular groove like reinforcing rim, a ring adapted to be retained within said reinforcing rim, supports mounted on said ring and extending upwardly and inwardly therefrom, a clamping ring carried by the upper ends of said supports and adapted to be clamped about a conventional drum, the ends of which have been removed, a band of smaller diameter than said trough providing a feeding area therebetween and the outer portion of said trough, said band having outwardly disposed ribs adapted to be contacted by feeding animals for imparting motion to the band to dislodge and cause the discharge of feed, a series of spaced rods connected to the lower edge of said band and converging in the vicinity of the axis of said band, a supporting bar for attachment across the upper open end of such conventional drum, and an adjustable support mounting said converging supports on said supporting bar whereby feed within the drum may be caused to be dislodged and discharged into the feeding area of said trough upon the engagement of said ribs by animals.

2. A device of the character described comprising a relatively shallow trough forming base having an upwardly turned marginal portion with an annular reinforcing rim groove-like at least for a substantial portion of its length, a drum adapted to contain material to be supplied to said trough, a clamping ring of smaller diameter than said trough adapted to be clamped about the lower portion of said drum, a plurality of relatively slim supports having their upper ends mounting said clamping ring concentrically above said trough and in spaced relation thereto, a ring attached to the lower ends of said relatively slim supports, said ring being retained within said reinforcing rim, and valve mechanism carried by said drum into said trough.

3. The structure of claim 2 and hooks suspended from said clamping ring and engaging the lower end of said drum for assisting in supporting the latter.

4. The structure of claim 2 in which said valve mechanism includes a float located in a manner to be buoyed by liquid in said trough, and a connection between said float and said valve to control the liquid level in said trough.

References Cited in the file of this patent

UNITED STATES PATENTS

| | | |
|---|---|---|
| 788,666 | Mosure | May 2, 1905 |
| 1,769,042 | Short | July 1, 1930 |
| 2,352,373 | Eash | June 27, 1944 |
| 2,525,385 | Vhrenholdt | Oct. 10, 1950 |
| 2,808,029 | Geerlings | Oct. 1, 1957 |